(12) United States Patent
Case et al.

(10) Patent No.: US 6,728,906 B1
(45) Date of Patent: Apr. 27, 2004

(54) TRACE BUFFER FOR A CONFIGURABLE SYSTEM-ON-CHIP

(75) Inventors: Jerry Case, San Jose, CA (US); James Murray, Mountain View, CA (US); Jean-Didier Allegrucci, Sunnyvale, CA (US)

(73) Assignee: Triscend Corporation, Mountain View, CA (US)

( * ) Notice: Subject to any disclaimer, the term of this patent is extended or adjusted under 35 U.S.C. 154(b) by 336 days.

(21) Appl. No.: 09/648,297

(22) Filed: Aug. 24, 2000

(51) Int. Cl.[7] .................................................. G06F 11/00
(52) U.S. Cl. ........................................... 714/45; 714/30
(58) Field of Search ............................... 714/30, 39, 45

(56) References Cited

U.S. PATENT DOCUMENTS

| | | | |
|---|---|---|---|
| 5,978,937 A | * 11/1999 | Miyamori et al. ............. 714/45 |
| 6,457,144 B1 | * 9/2002 | Eberhard ..................... 714/45 |
| 6,523,136 B1 | * 2/2003 | Higashida .................... 714/30 |
| 6,530,047 B1 | * 3/2003 | Edwards et al. ............. 714/724 |
| 6,550,022 B1 | * 4/2003 | Fever ........................... 714/34 |

OTHER PUBLICATIONS

Structured Real–time Firmware, date unknown.*

Hardware circular buffer, www.onelook.com.*

* cited by examiner

Primary Examiner—Robert Beausoliel
Assistant Examiner—Bryce P. Bonzo
(74) Attorney, Agent, or Firm—Blakely, Sokoloff, Taylor & Zafman LLP

(57) ABSTRACT

An integrated circuit including a processor, a processor bus coupled to the processor, a system bus and a trace buffer. The trace buffer may capture activity on either the processor bus or the system bus.

34 Claims, 5 Drawing Sheets

201
| SRAM #16 | SRAM #15 | SRAM #14 | SRAM #13 | SRAM #12 | SRAM #11 | SRAM #10 | SRAM #9 | SRAM #8 | SRAM #7 | SRAM #6 | SRAM #5 | SRAM #4 | SRAM #3 | SRAM #2 | SRAM #1 |
|---|---|---|---|---|---|---|---|---|---|---|---|---|---|---|---|
| 201A | 201B | 201C | 201D | 201E | 201F | 201G | 201H | 201I | 201J | 201K | 201L | 201M | 201N | 201O | 201P |

FIG. 2A

202
| 202A | | | 202D |
|---|---|---|---|
| SRAM #16 | SRAM #12 | SRAM #8 | SRAM #4 |
| SRAM #15 | SRAM #11 | SRAM #7 | SRAM #3 |
| SRAM #14 | SRAM #10 | SRAM #6 | SRAM #2 |
| SRAM #13 | SRAM #9 | SRAM #5 | SRAM #1 |
| 202M | | | 202P |

FIG. 2B

TRACE BUFFER FOR A CONFIGURABLE SYSTEM-ON-CHIP

FIELD OF THE INVENTION

The present invention relates to the field of integrated circuits. More particularly, the present invention relates to trace buffers in integrated circuits.

BACKGROUND OF THE INVENTION

Trace buffers are commonly included in processor-based systems to capture a snapshot of the executing system bus over a time. Using the trace buffer, debug software can recreate the system activity around the occurrence of a particular event, known as the breakpoint event. The debug software reads data out of the trace buffer to detect activity occurring around the breakpoint event to determine, for example, what caused the breakpoint event or what sequence of events surround the breakpoint event.

Some processors include trace buffers for use with the processor bus. However, the trace buffers included with processors typically record only activity that occurs on the processor bus. Also, the trace buffer occupies valuable space after debugging is complete.

SUMMARY OF THE INVENTION

A integrated circuit is described. In one embodiment, the integrated circuit includes a processor, a processor bus coupled to the processor, a system bus and a trace buffer. The trace buffer may capture activity on either the processor bus or the system bus.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 2a is a block diagram of one embodiment of the trace buffer of FIG. 1;

FIG. 2b is a block diagram of one embodiment of the trace buffer of FIG. 1 configured as a SRAM;

DETAILED DESCRIPTION

A method and system for capturing activity in a processing system is disclosed.

Figure 1:
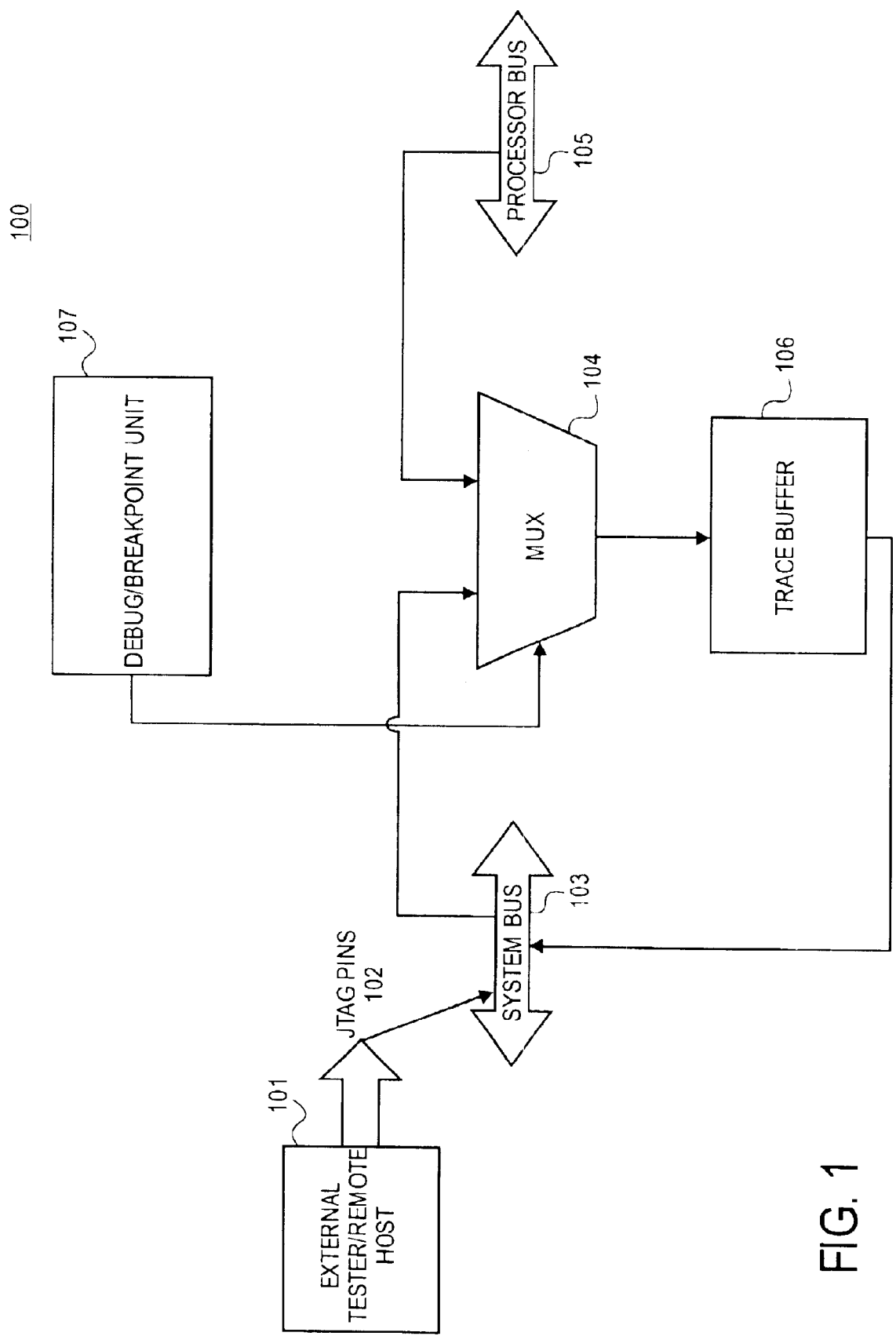
FIG. 1 is a block diagram of one embodiment of a system including the trace buffer of the present invention.

FIG. 1 is a block diagram of one embodiment of a system including the trace buffer of the present invention. System 100 includes an external tester 101 including JTAG pins 102, a system bus 103, a processing bus 105, a multiplexer 104, a trace buffer 106 and a debug/breakpoint unit 107.

The external tester 101 is connected to system bus 103 through JTAG pins 102. Multiplexer 104 receives signals from both system bus 103 and processing bus 105 as inputs. Debug/breakpoint unit 107 also provides a controlling input into multiplexer 104. Trace buffer 106 receives the output of multiplexer 104. The output of the trace buffer 106 is coupled to system bus 103.

Trace buffer 106 receives bus cycles from either system bus 103 or processing bus 105. The bus from which trace buffer 106 receives bus cycles to record is determined by the input from debug/breakpoint unit 107, which may be determined, in one embodiment, by a user. The user may also determine a specific type of bus cycle or bus activity to write into the trace buffer 106.

Thus, trace buffer 106 is capable of receiving inputs from either system bus 103 or processing bus 105. Using this mechanism, the trace buffer contents may read from either the processor or from external software through the JTAG interface unit 102. When the user no longer requires the use of the trace buffer to debug the system 101, the trace buffer may be used as a scratchpad static random access memory ("SRAM").

FIG. 2a is a block diagram of one embodiment of the trace buffer of FIG. 1. The trace buffer 201, in one embodiment, includes 16 512×8 SRAM modules 201a–201p. In the trace buffer functional mode, the SRAM functions as a single 512×128 memory. Because the 128-bit memory is large enough toehold all relevant bus signals, the trace buffer may capture cycles of bus activity at the full rate of either the processor bus 105 or the system bus 103.

FIG. 2b is a block diagram of one embodiment of the trace buffer of FIG. 1 configured as a SRAM. Referring to FIG. 2b, the trace buffer 106 functions as a scratch pad SRAM 202. In a scratchpad SRAM functional mode, the 16 512×8 SRAM modules 202a–202p function as a single 2048×32 memory. This scratch pad SRAM 202 may be accessed from the processor bus 105 or from the system bus 103.

Although the trace buffer is described as 16 512×8 SRAM modules, in other embodiments, the trace buffer 106 may be of any size such as, for example, 4 512×32 SRAM modules. More significantly, the same SRAM modules may be used as (n×data bus width) and as (m×trace buffer width).

Figure 3:
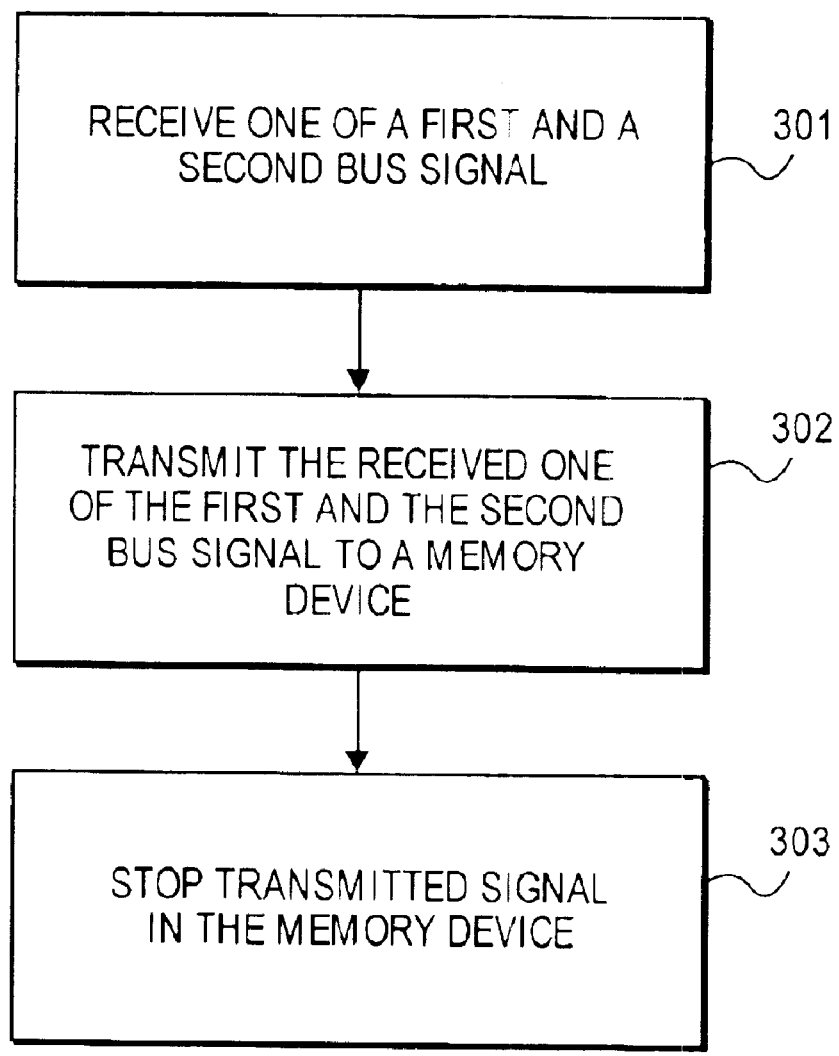
FIG. 3 is a flow diagram of one embodiment of a method of operating the trace buffer of FIG. 1.

FIG. 3 is a flow diagram of one embodiment of a method of operating the trace buffer of FIG. 1. Flow diagram 300 illustrates the function of a trace buffer capable of receiving signals from at least one of the two busses. At processing block 301, a debugging system receives a one of a first and a second bus signal. The received signal may be a bus signal from a system bus 103 or a processor bus 105, in one embodiment. The debugging system may include, in one embodiment, a trace buffer 106, a multiplexer 104, and a debug/breakpoint unit 107.

At processing block 302, the debugging system transmits the received one of the first bus signal and the second bus signal to a memory device 106 based on predetermined criteria. The predetermined criteria, in one embodiment, may be determined by a user. The predetermined criteria may include criteria such as, for example, the bus from which memory device 106 should receive data and what type of data is to be written into memory device 106 (i.e., what types of events should be written to memory device 106). Thus, in one embodiment, the received signal will be transmitted if the received signal satisfies the predetermined criteria.

At processing block 303, the one of the first bus signal and the second bus signal transmitted to memory device 106 is stored in the memory device 106.

Figure 4:
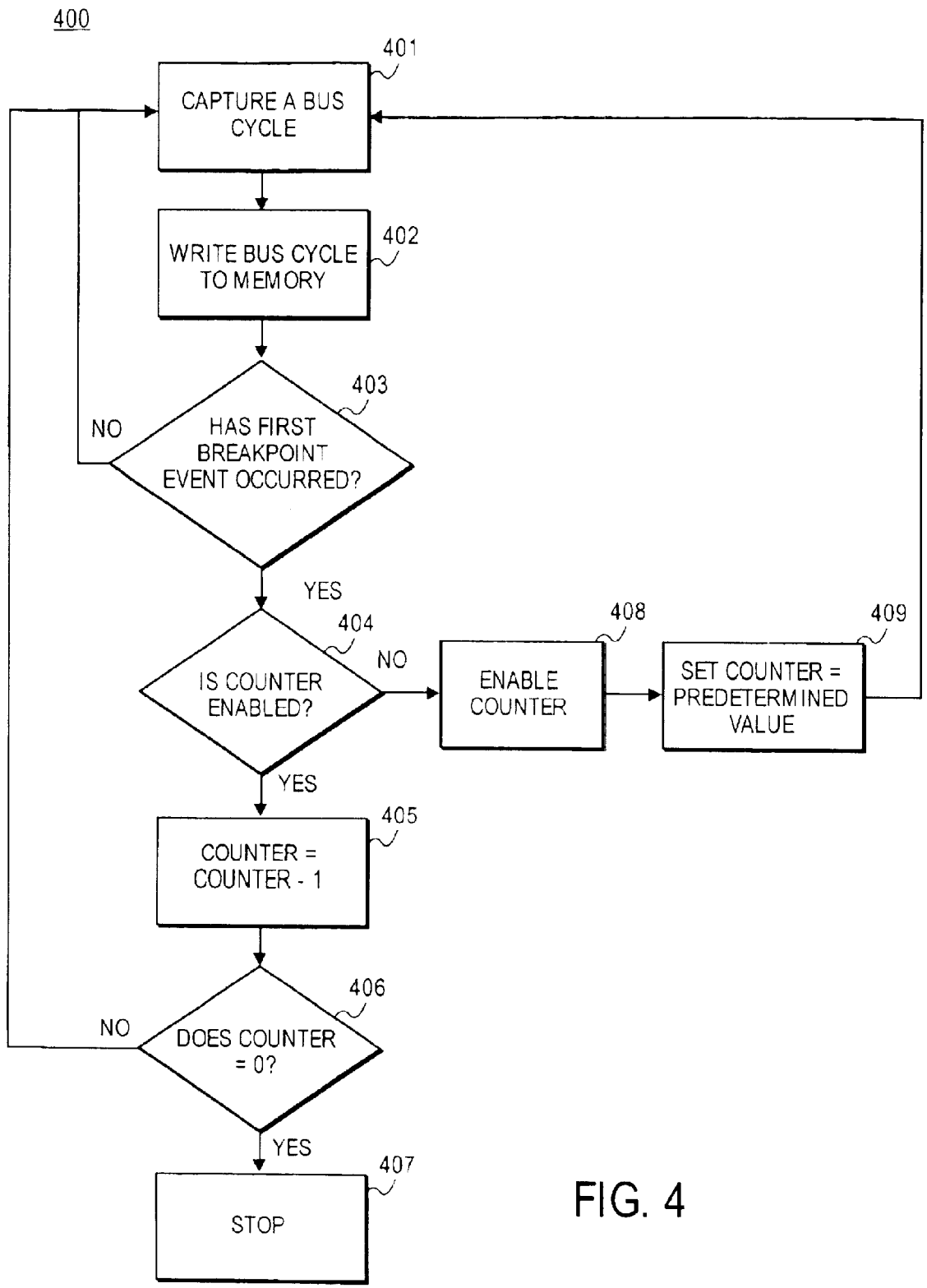
FIG. 4 is a flow diagram of another embodiment of a method of operating the trace buffer of FIG. 1.

FIG. 4 is a flow diagram of another embodiment of a method of operating the trace buffer of FIG. 1. Flow diagram 400 illustrates the operation of a trace buffer capable of capturing a variable number of cycles after a breakpoint event occurs.

At processing block 401, the debug system captures a bus cycle. At processing block 402, the debug system writes the bus cycle into memory 106. For example, in one embodiment, the debug system will write the current bus cycle into a memory address corresponding to a memory address pointer value between 0 and 511 where the trace buffer is 16 512×8 SRAM modules functioning as a single 512×128 memory.

At processing block 403, the debug system checks to see if a first breakpoint event has occurred. If a first breakpoint event has not occurred, the debug system returns to processing block 401 to capture the next bus cycle.

If a first breakpoint event has occurred, the debug system checks to see if a counter has been enabled at processing block 404. The counter may be a 9-bit counter which counts down from an initial value which may be, in one embodiment, programmed by software.

If the counter has not been enabled, at processing block 408, the debug system enables the counter and, at processing block 409, the debug system sets the counter to equal a predetermined value. This predetermined value, in one embodiment, is an initial value programmed by software to represent the number of cycles after the breakpoint event that is desired to be captured. Thus, in one embodiment, the predetermined value is programmed by a user. The debug system then returns to processing block 401, at which the debug system captures the next bus cycle.

If the counter has been enabled, at processing block 404, at processing block 405, the counter is decremented by one (i.e., counter=counter−1). At processing block 406, the debug system checks to see if the counter equals zero. If the counter equals zero, the number of cycles desired to be captured after the breakpoint event has been captured. Thus, at processing block 407, the debug system stops capturing bus cycles and writing bus cycles to memory.

If the counter does not equal zero at processing block 406, the debug system returns to processing block 401 to capture the next bus cycle.

Thus, the trace buffer captures a variable number of cycles after the breakpoint event. The number of cycles captured after the breakpoint event may be determined by a user through, in one embodiment, a value programmed into the trace counter by software.

Figure 5:
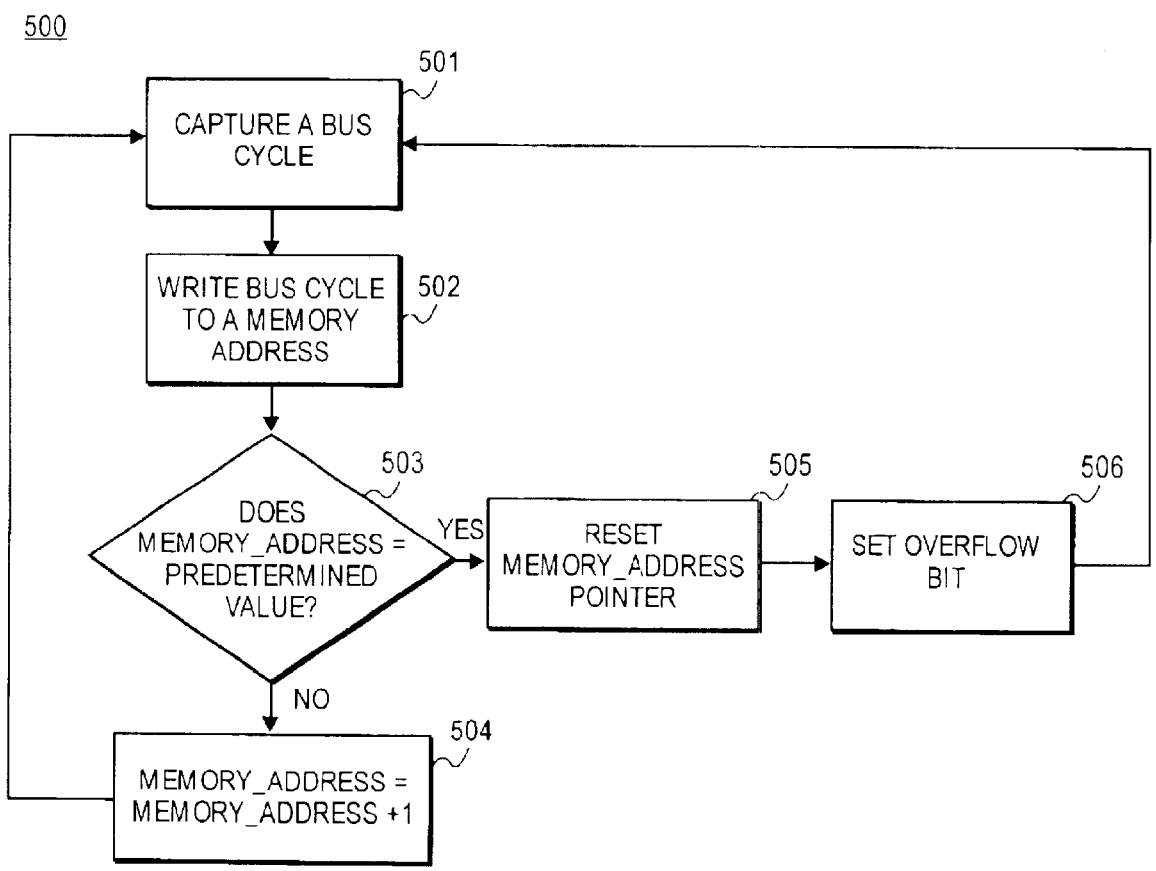
FIG. 5 is a flow diagram of another embodiment of a method of operating the trace buffer of FIG. 1.

FIG. 5 is a flow diagram of another embodiment of a method of operating the trace buffer of FIG. 1. Flow diagram 500 illustrates the operation of a trace buffer from which valid data will be read by, for example, debugging software.

At processing block 501, a debugging system captures the bus cycle. At processing block 502, the bus cycle is written into a memory address corresponding to a memory address pointer value.

At processing block 503, the debugging system checks to see if the memory address pointer value equals a predetermined value. The predetermined value may be the number of addresses available in which to write a bus cycle. In one embodiment, the predetermined value is the number of addresses available in which to write a bus cycle minus one because the first address is 0. Thus, for the trace buffer 106 of FIG. 2a, the predetermined value may 511 if the first address is 0.

If the memory address pointer value does not equal the predetermined value at processing block 503, the memory address pointer value is incremented by one at processing block 504. Then, the debugging system returns to the processing block 501 to capture the next bus cycle.

At processing block 505, if the memory address pointer value does equal the predetermined value, the memory address pointer is reset. For example, if there are 512 addresses available, starting with address 0, the memory address pointer will be reset to 0 once data has been written to address 511. In one embodiment, the memory address pointer is a nine-bit address pointer.

At processing block 506, an overflow bit is set. The overflow bit is read by the debug software, along with the address pointer, after the trace buffer has finished capturing all desired bus cycles, to determine what trace buffer contents are valid captured cycles. If the overflow bit is set, all cycles from the address pointer to the last available address (e.g., 511), are implied to be valid bus cycles. If the overflow bit is not set, all cycles from the address pointer inclusive to the last available address (e.g., 511) are implied to be not valid bus cycles. The cycles from address 0 to the address pointer are always valid cycles. The debugging system then returns to processing block 501 to capture the next bus cycle.

The trace buffer described may be used with a configurable system on a chip. A configurable system on a chip may include a processor bus and a system bus. Thus, the trace buffer described may capture the activity on either the processor bus or the system bus, as programmed by a user. When the user is finished using the trace buffer 106 to capture activity to debug a system bus 103 or a processor bus 105, the trace buffer may be used as a scratchpad SRAM 202. The trace buffer described may also capture a variable number of cycles after a breakpoint event occurs. It will be understood that the methods described need not include all of the processes described above and the processes may be in any order.

The processes described herein may be performed by processing logic, which may comprise hardware, software, or a combination of both. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signal (e.g., carrier waves, infrared signals, digital signals, etc.); etc.

In the foregoing specification, the invention has been described with reference to specific exemplary embodiments thereof It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. An integrated circuit comprising:
   a processor;
   a processor bus coupled to the processor;
   a system bus;
   a multiplexer having a first input coupled to the processor bus and a second input coupled to the system bus; and,
   a trace buffer coupled to an output of the multiplexer so as to enable the trace buffer to capture processor bus activity and system bus activity.

2. The integrated circuit of claim 1 wherein the trace buffer is a static random access memory device ("SRAM").

3. The integrated circuit of claim 1 wherein the trace buffer captures a predetermined number of events.

4. The integrated circuit of claim 3 wherein the predetermined number is set by a user.

5. The integrated circuit of claim 1 wherein the trace buffer captures at least one predetermined type of event.

6. The integrated circuit of claim 5 wherein the at least one predetermined type of event is determined by the user.

7. The integrated circuit of claim 1 wherein the trace buffer comprises a plurality of SRAM modules.

8. An integrated circuit comprising:
a processor;
processor bus coupled to the processor;
a system bus; and,
random access memory ("RAM") coupled to taps that exude from the processor bus and the system bus so as to enable the random access memory to behave as both:
1) a trace buffer that can capture processor bus activity and system bus activity during testing of the integrated circuit;
2) a scratchpad memory that is accessible to the processor bus and the system bus when the integrated circuit is not being tested.

9. The integrated circuit of claim 8 wherein the RAM can capture a predetermined number of events during the testing.

10. The integrated circuit of claim 9 wherein the predetermined number is set by a user.

11. The integrated circuit of claim 8 wherein the RAM can capture at least one predetermined type of event during the testing.

12. The integrated circuit of claim 11 wherein the at least one predetermined type of event is determined by the user.

13. The integrated circuit of claim 8 wherein the trace buffer is viewed as being m wide during the testing and is viewed as being n wide during the non testing, where, n is larger than m.

14. The integrated circuit of claim 13 wherein m is 8.

15. The integrated circuit of claim 13 wherein n is 32.

16. The integrated circuit of claim 8 further comprising a multiplexer between the taps and the RAM.

17. A system comprising:
a system bus including a system bus activity output;
a processor;
a processor bus coupled to the processor and including a processor bus activity output;
a multiplexer unit having inputs respectively coupled to the system bus activity output and the processor bus activity output; and,
a trace buffer to receive the output of the multiplexer.

18. The system of claim 17 further comprising a debug/breakpoint unit coupled to the multiplexer to direct the output of the multiplexer.

19. The system of claim 17 wherein the trace buffer also functions as a scratchpad RAM.

20. The system of claim 17 wherein the trace buffer captures a predetermined number of events.

21. The system of claim 20 wherein the predetermined number is set by a user.

22. The system of claim 17 wherein the trace buffer captures at least one predetermined type of event.

23. The system of claim 22 wherein the at least one predetermined type of event is determined by the user.

24. The integrated circuit of claim 17 wherein the trace buffer comprises sixteen 512×8 SRAM modules.

25. A method of capturing activity in a processing system comprising:
receiving one of a processor bus signal and a system bus signal;
transmitting the one of the processor bus signal and the system bus signal to a memory device if the one of the processor and the system bus signal satisfies predetermined criteria;
storing the transmitted one of the processor bus signal and the system bus signal in the memory device.

26. The method of claim 25 wherein the predetermined criteria comprises at least one of a bus type and an event type.

27. The method of claim 25 wherein the predetermined criteria is determined by a user.

28. A machine-readable medium that provides instructions, which when executed by a machine, cause the machine to perform operations comprising:
receiving one of a processor bus signal and a system bus signal;
transmitting the one of the processor bus signal and the system bus signal to a memory device if the one of the processor and the system bus signal satisfies predetermined criteria;
storing the transmitted one of the processor bus signal and the system bus signal in the memory device.

29. The machine-readable medium of claim 28 wherein the predetermined criteria comprises at least one of a bus type and an event type.

30. The machine-readable medium of claim 28 wherein the predetermined criteria is determined by a user.

31. A method of capturing activity in a processing system comprising:
capturing a bus cycle;
writing the bus cycle into a memory address pointed to by a memory address pointer;
incrementing the memory address pointer by one if the address pointer does not equal a predetermined value;
resetting the memory address pointer and setting an overflow bit if the memory address pointer equals the predetermined value
wherein a set overflow bit indicates that all cycles from the address pointer to a memory address corresponding to the predetermined value are valid and a not set overflow bit indicates that all cycles from the address pointer to the memory address corresponding to the predetermined value are not valid.

32. A machine-readable medium that provides instructions, which when executed by a machine, cause the machine to perform operations comprising:
capturing a bus cycle;
writing the bus cycle into a memory address pointed to by a memory address pointer;
incrementing the memory address pointer by one if the address pointer does not equal a predetermined value;
resetting the memory address pointer and setting an overflow bit if the memory address pointer equals the predetermined value
wherein a set overflow bit indicates that all cycles from the address pointer to a memory address corresponding to the predetermined value are valid and a not set overflow bit indicates that all cycles from the address pointer to the memory address corresponding to the predetermined value are not valid.

33. A method of capturing activity in a processing system comprising:
capturing a bus cycle;
writing the bus cycle into a memory address pointed to by a memory address pointer in a memory;

setting a counter to a predetermined value if a first breakpoint event occurs, said predetermined value set with software;

decrementing the counter by 1 after each captured cycle is written to the memory subsequent to the first breakpoint event;

continuing to write bus cycles to the memory if the counter does not equal 0; and ceasing to write bus cycles to the memory if the counter equals 0.

34. A machine-readable medium that provides instructions, which when executed by a machine, cause the machine to perform operations comprising:

capturing a bus cycle;

writing the bus cycle into a memory address pointed to by a memory address pointer in a memory;

setting a counter to a predetermined value if a first breakpoint event occurs, said predetermined value set with software;

decrementing the counter by 1 after each captured cycle is written to the memory subsequent to the first breakpoint event;

continuing to write bus cycles to the memory if the counter does not equal 0; and ceasing to write bus cycles to the memory if the counter equals 0.

* * * * *